United States Patent
Cheng

[11] Patent Number: 6,058,088
[45] Date of Patent: May 2, 2000

[54] METHOD FOR CLEANING A COMPACT DISK DRIVE BY USING A CLEANING DISK

[75] Inventor: Lin Chi Cheng, Tao-Yuan, Taiwan

[73] Assignee: Acer Peripherals, Inc., Taoyuan, Taiwan

[21] Appl. No.: 08/984,368

[22] Filed: Dec. 3, 1997

[30] Foreign Application Priority Data

Nov. 28, 1997 [TW] Taiwan ................................ 86117906

[51] Int. Cl.⁷ ....................................................... G11B 3/58
[52] U.S. Cl. .............................................................. 369/71
[58] Field of Search ................................... 360/128, 133; 369/71, 72, 271, 292; 15/256.5, 246

[56] References Cited

U.S. PATENT DOCUMENTS

| | | | |
|---|---|---|---|
| 4,817,078 | 3/1989 | Iwata | 369/71 |
| 5,088,082 | 2/1992 | Yamada et al. | 369/71 |
| 5,088,083 | 2/1992 | Olson | 369/71 |
| 5,117,411 | 5/1992 | Nakagawa | 369/72 |
| 5,268,890 | 12/1993 | Colescott | 369/71 |
| 5,499,228 | 3/1996 | Takeda | 369/71 |

*Primary Examiner*—Stuart S. Levy
*Assistant Examiner*—Angel Castro
*Attorney, Agent, or Firm*—Winston Hsu

[57] ABSTRACT

The present invention provides a cleaning method which utilizes a cleaning disk to clean a compact disk drive. The compact disk drive comprises a compact disk holder for holding a compact disk, a motor for spinning the compact disk holder, an optical module having an optical lens, a lens driver for driving the optical lens up and down to focus the optical lens on the compact disk, and a radial driver for moving the optical module horizontally. The cleaning disk comprises a cleaning means installed on the cleaning surface of the cleaning disk for cleaning the optical lens. The cleaning method comprises: (1) using the radial driver to drive the optical module to a test region on the cleaning surface and using the lens driver to focus the optical lens on the test region; and (2) using the motor to spin the disk and using the radial driver and lens driver to move the optical lens to interact with the cleaning means so as to clean the optical lens.

10 Claims, 3 Drawing Sheets

METHOD FOR CLEANING A COMPACT DISK DRIVE BY USING A CLEANING DISK

BACKGROUND OF THE INVENTION

1. Field of the invention

The present invention relates to a cleaning method of a compact disk drive, and more particularly, to a method for cleaning an optical lens of a compact disk drive by using a cleaning disk.

2. Description of the Prior Art

Compact disks are widely used in today's office environment for storing bulk digital data. When reading data from a compact disk, its data side is always facing downward, and the optical lens of a compact disk drive is facing upward toward the data side of the compact disk. Since the optical lens is not operated in a sealed environment like a hard disk drive, dusts and impurities will gradually accumulate on the surface of the optical lens which will reduce its reading capability. Cleaning the optical lens is usually required when the compact disk drive has been used for a couple of months. There are several cleaning disks in the market already for cleaning the optical lens of a compact disk drive.

Please refer to FIG. 1. FIG. 1 shows the cleaning side 12 of a conventional cleaning disk 10. It has a hairy brush 14 mounted on the cleaning side 12 for cleaning the optical lens of a compact disk drive. Most of the cleaning side 12 can reflect laser beams like the data side of an ordinary compact disk except for the area covered by the brush 14. When the cleaning disk 10 is inserted into a conventional compact disk drive, the compact disk drive will move its optical lens to the innermost track of the cleaning side 12 and the optical lens will be moved to be focused on the innermost track of the cleaning side 12 in order to adjust the distance between the optical lens and the cleaning side 12. After the optical lens has focused on the innermost track, the compact disk drive will move the optical lens outward to read data imprinted on the cleaning side 12. When moving the optical lens outward, the optical lens will be continuously focused on the surface of the cleaning side 12 and the distance between the optical lens and the cleaning disk 10 will thus be maintained. Because the hair length of the brush 14 is designed longer than the focus distance between the optical lens and the cleaning disk 10, the brush 14 will sweep across the surface of the optical lens and wipe out the dusts accumulated on the optical lens when the optical lens is moved across the hairy brush 14 mounted on the cleaning region 16.

One drawback is found in the above mentioned cleaning method. When the optical lens contacts the brush 14, the optical lens will lose its focus immediately since the brush 14 can not reflect laser beams. This will be treated as a reading failure by the conventional compact disk drive and the optical lens will be descended and retreated by the compact disk drive immediately when reading failure occurs. Such response will allow the brush 14 of the cleaning disk 10 to clean the optical lens only once or twice when the cleaning disk 10 is placed into the compact disk drive. In order to force the brush 14 to clean the optical lens again, a user has to repeatedly insert the cleaning disk 10 into the compact disk drive.

There are other cleaning disks similar to the cleaning disk 10 shown in FIG. 1. For example, a series of small brushes may be arranged in a circle pattern instead of in a line pattern like the brush 14. But they all come with the same drawback like the one mentioned above.

SUMMARY OF THE INVENTION

It is therefore a primary objective of the present invention to provide a method for cleaning the optical lens of a compact disk drive which can effectively clean the optical lens without undergoing the above mentioned problem.

In a preferred embodiment, the present invention provides a cleaning method utilizing a cleaning disk for cleaning the optical lens of a compact disk drive. The compact disk drive comprises a compact disk holder for holding a compact disk, a motor for spinning the compact disk holder, an optical module having a movable optical lens, a lens driver for driving the optical lens vertically to focus the optical lens on the compact disk, and a radial driver for moving the optical module horizontally. The cleaning disk comprises a cleaning means installed on the cleaning surface of the cleaning disk for cleaning the optical lens. The cleaning method comprises:

(2) using the radial driver to drive the optical module to a test region on the cleaning surface, and using the lens driver to focus the optical lens on the test region around a predetermined focus distance;

(2) using the motor to spin the cleaning disk if focusing on the test region is failed;

(3) using the radial driver and lens driver to move the optical lens to interact with the cleaning means on the cleaning surface for cleaning the optical lens.

It is an advantage of the present invention that a user only needs to load a specifically designed cleaning disk into the compact disk drive and the compact disk drive will identify the cleaning disk and clean its optical lens using the cleaning means on the cleaning disk.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 2:
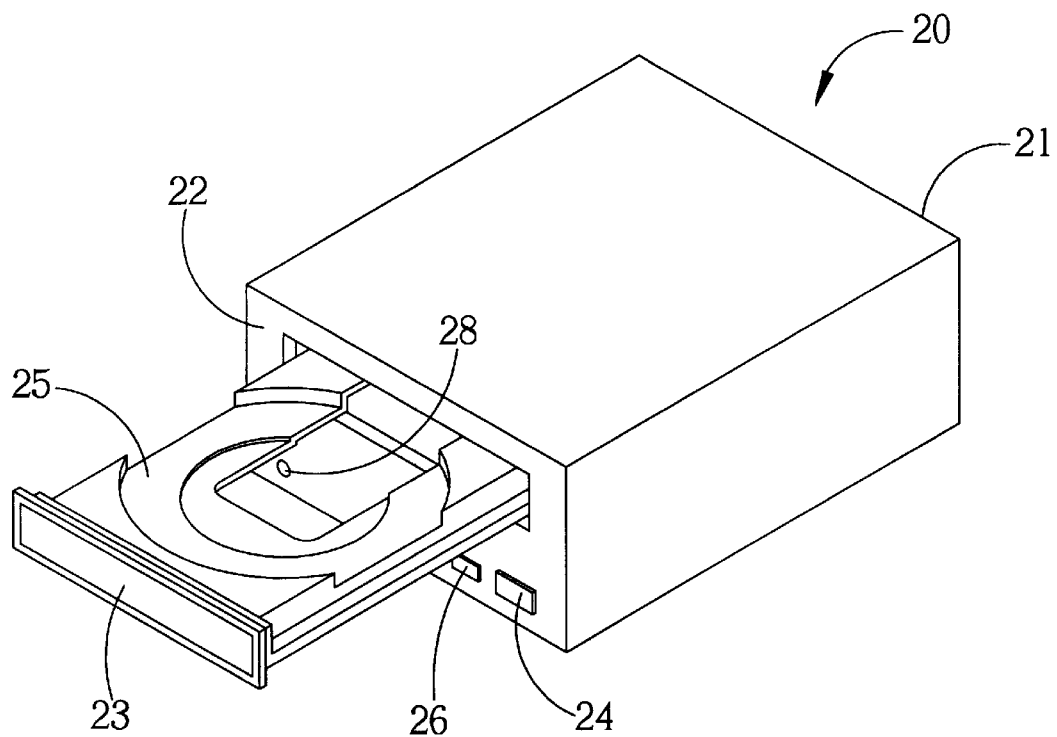
FIG. 2 is a perspective view of a compact disk drive according to the present invention.

Please refer to FIG. 2. FIG. 2 is a perspective view of a compact disk drive 20 of this invention. The compact disk drive 20 is used in a personal computer for reading data imprinted in a compact disk. It comprises a rectangular housing 21 having a control panel 22 at its front end. The control panel 22 comprises a cover 23, an eject button 24 for controlling a disk carrier 25 moving in and out of the cover 23, a cleaning button 26 for activating a cleaning process, and an indicator 28 for indicating the state of the compact disk drive 20.

Figure 3:
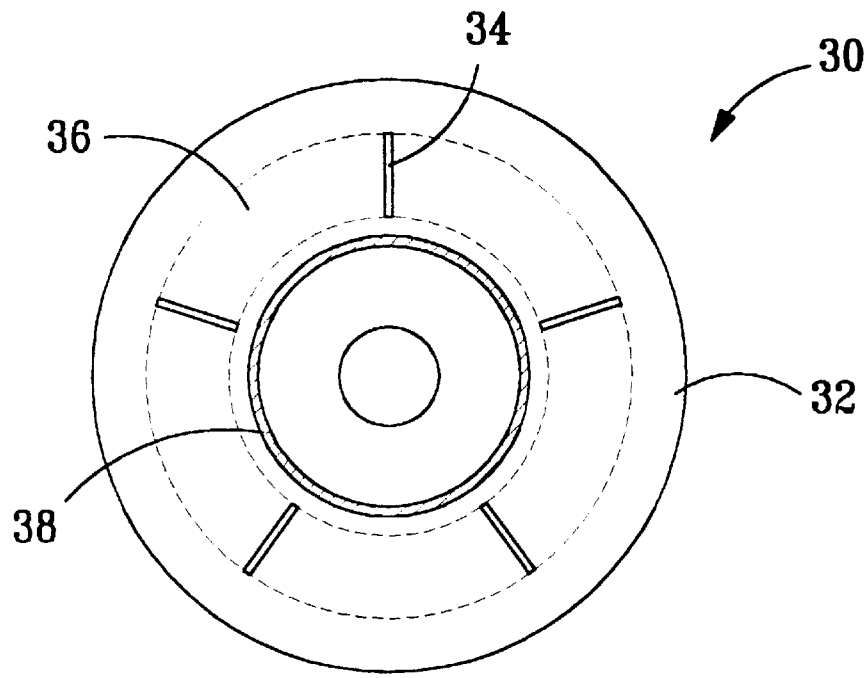
FIG. 3 shows a cleaning side of a cleaning disk according to the present invention.

Please refer to FIG. 3. FIG. 3 shows a cleaning side 32 of a cleaning disk 30 according to the present invention. The shape and size of the cleaning disk 30 is the same as a ordinary compact disk. The cleaning side 32 of the cleaning disk 30 comprises a cleaning region 36, a plurality of hairy brushes 34 mounted in the cleaning region 36 for cleaning an optical lens, and a test region 38 located at the innermost track of the cleaning side 32 for identification of the cleaning disk 30. There are many ways to build the test region 38 for identifying the cleaning disk 30. One preferred method is to make the test region 38 a non-reflective region. Since all the normal compact disks should have a reflective innermost track, it is thus possible to use a non-reflective innermost track as an identification mark to identify the cleaning disk 30. Since the non-reflective test region 38 can not reflect laser beams emitted from a laser diode behind the optical lens, the optical lens can not be focused on the test region 38 when the optical lens is moved to the innermost track of the cleaning disk 30. This will make the compact disk drive 20 recognize that the loaded compact disk is the cleaning disk 30.

Figure 4:
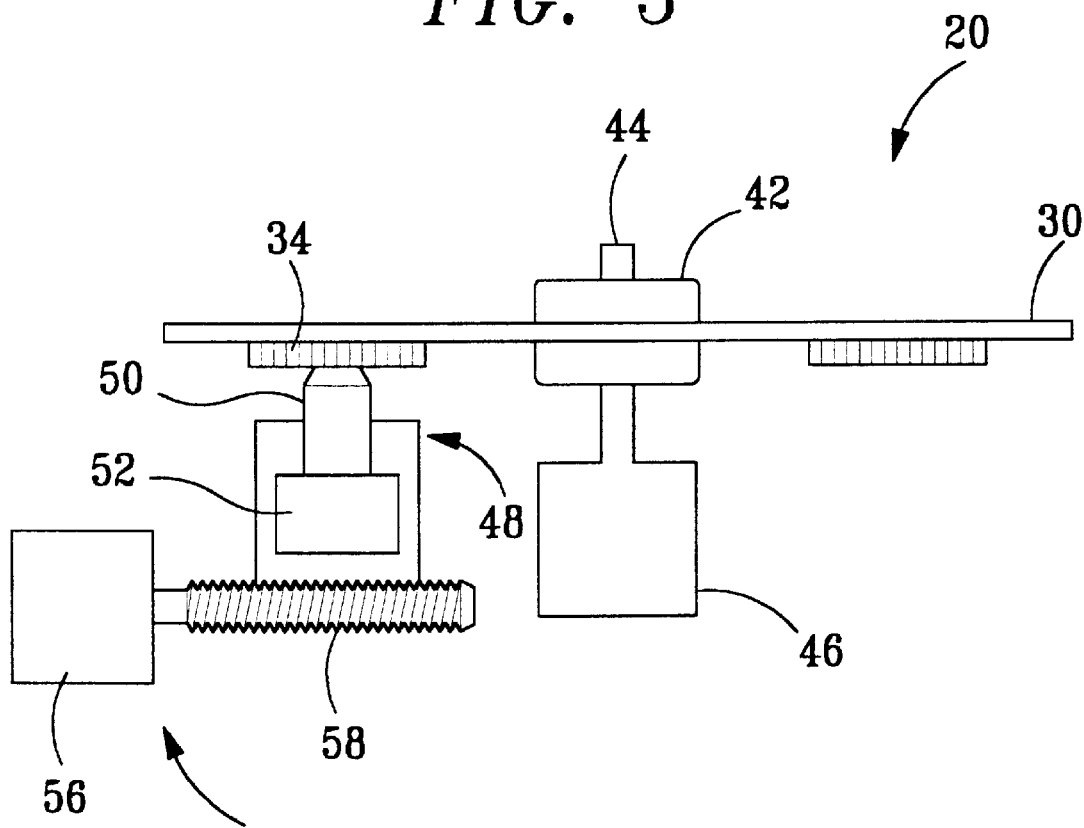
FIG. 4 is a diagrammatic view of the internal components of the compact disk drive shown in FIG. 2 loaded with the cleaning disk shown in FIG. 3.

Please refer to FIG. 4. FIG. 4 is a diagrammatic view of the internal components of the compact disk drive 20 shown in FIG. 2 loaded with the cleaning disk 30 shown in FIG. 3. The compact disk drive 20 comprises a disk holder 42 for holding the cleaning disk 30 horizontally, a spinning shaft 44 for rotating the disk holder 42, a motor 46 installed under the disk holder 42 for spinning the shaft 44, the disk holder 42 and the cleaning disk 30, an optical module 48 installed under the disk 30 having a movable optical lens 50 facing the disk 30 for reading data imprinted on the disk 30, a lens driver 52 for driving the optical lens 50 up and down to focus the optical lens 50 on the disk 30, and a radial driver 54 for driving the optical module 48 horizontally. The radial driver 54 comprises a thread column 58 and a stepping motor 56. The stepping motor 56 is used to spin the thread column 58 so that the optical module 48 can be horizontally driven across the surface of the disk 30.

Figure 5:
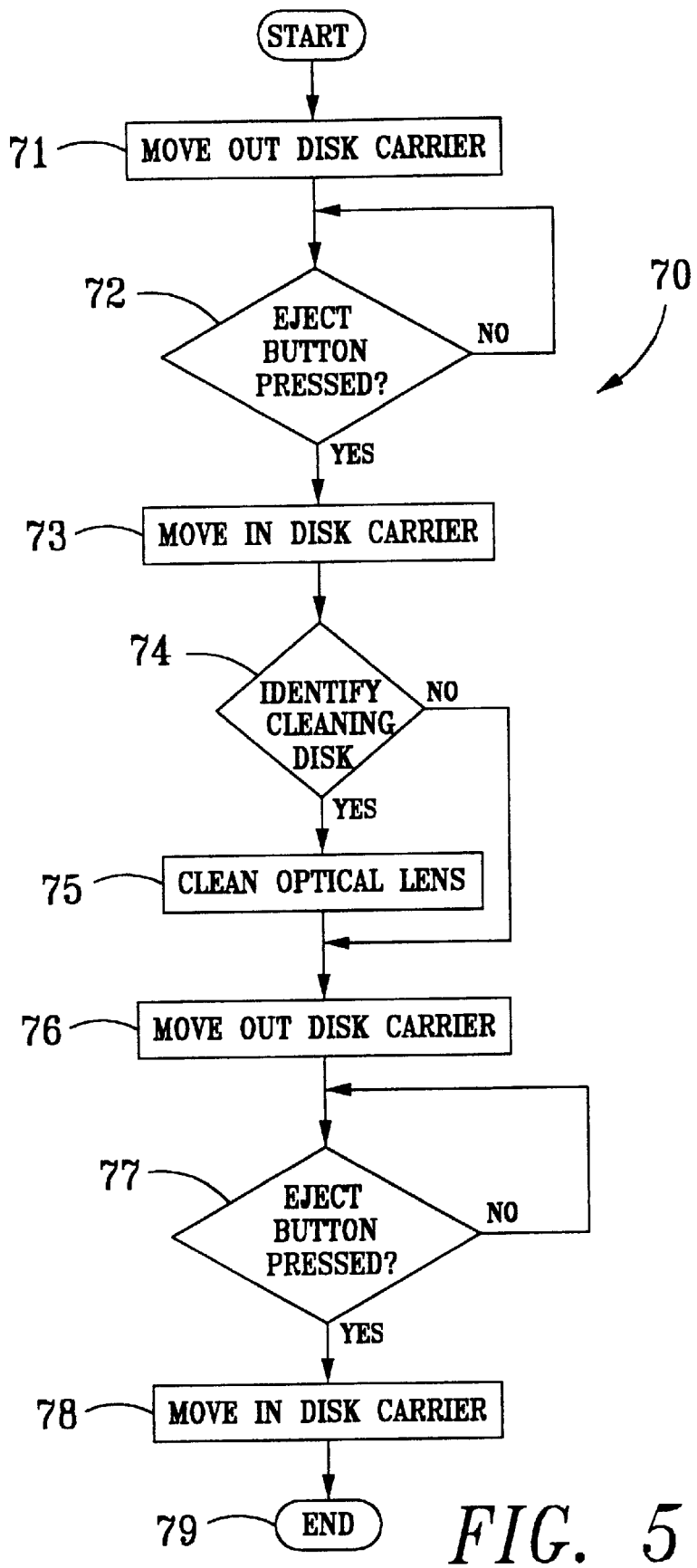
FIG. 5 is a flow chart of a compact disk drive cleaning process according to the present invention.

Please refer to FIG. 5. FIG. 5 is a flow chart of a compact disk drive cleaning process 70 according to the present invention. The process 70 can be initiated by pressing the cleaning button 26 or by using a computer connected to the compact disk drive 20. The cleaning process 70 comprises the following steps:

Step 71: move a disk carrier 25 out of the cover 23 to load a disk;

Step 72: test if the eject button 24 is pressed; if not, test again;

Step 73: move in the disk carrier 25 to load the disk;

Step 74: drive the optical lens 50 to the innermost track, and focus the optical lens 50 on the test region 38 to identify whether the loaded disk is a cleaning disk 30; if it isn't the cleaning disk, go to step 76;

Step 75: use the lens driver 52 to move the optical lens 50 to a predetermined height under the cleaning disk, use the motor 46 to spin the disk, move the optical lens 50 to the cleaning region 36 and interact with the brushes 34 in the cleaning region 36 to clean the optical lens 50;

Step 76: descend and restore the optical lens 50, and move out the disk carrier 25 to remove the disk;

Step 77: test if the eject button 24 is pressed; if not, test again;

Step 78: move in the disk carrier 25;

Step 79: finish the process.

In Step 75, the radial driver 54 will move the optical lens 50 back and forth around the cleaning region 36 and the lens driver 52 will hold the optical lens 50 approximately around the predetermined height so that the optical lens 50 can physically interact with the brushes 34 to clean the optical lens 50. The predetermined height of the optical lens 50 under the cleaning disk should be adapted to the length of the brush 34 so that the optical lens 50 can be touched by the brush 34 but not by the surface of the cleaning disk.

Figure 1:
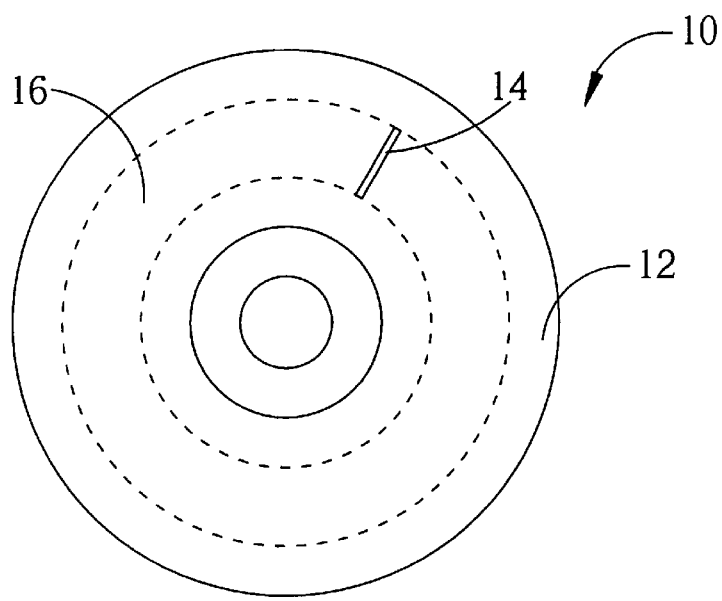
FIG. 1 shows a cleaning side of a conventional cleaning disk.

The cleaning process 70 shown in FIG. 5 uses the cleaning disk 30 provided according to the present invention. A similar cleaning process which uses a conventional cleaning disk such as the disk 10 shown in FIG. 1 is provided below according to the present invention. The user must make sure that the loaded disk is a conventional cleaning disk. The cleaning process below can be initiated in a different way such as by pressing both the cleaning button 26 and eject button 24 simultaneously, or by a computer connected to the compact disk drive 20. The cleaning process which uses a conventional cleaning disk comprises the following steps:

Step 81: move out the disk carrier 25 to load a conventional cleaning disk;

Step 82: test if the eject button 24 is pressed; if not, test again;

Step 83: move in the disk carrier 25 to load the disk;

Step 84: drive the optical lens 50 by using the radial driver 54 to the innermost track of the disk and focus the optical lens 50 on the innermost track of the disk to obtain a focus height by using the lens driver 52; if the optical lens 50 cannot be focused on, go to step 86;

Step 85: use the motor 46 to spin the disk and move the optical lens 50 outward to clean by using the radial driver 54 and using the lens driver 52 to hold the optical lens 50 approximately around the focus height under the cleaning surface of the disk so as to make the optical lens 50 to interact with the cleaning means on the cleaning surface of the disk;

Step 86: descend and restore the optical lens 50, and move out the disk carrier 25 to remove the disk;

Step 87: test if the eject button 24 is pressed; if not, test again;

Step 88: move in the disk carrier 25;

Step 89: finish the process.

In Step 85, the optical lens 50 will be moved by using the radial driver 54 from the innermost track to the outermost track back and forth several times so that the optical lens 50 can be more thoroughly cleaned.

The cleaning button 26 may be accidentally touched by a user to initiate one of the above two cleaning processes. Two methods can be used to avoid such situation. First, a plastic cover can be built to cover the cleaning button 26 so that it can not be directly touched by a user. Second, the cleaning button 26 can be restricted to initiate one of the two cleaning methods only when powering on the compact disk drive 20.

Those skilled in the art will readily observe that numerous modifications and alternations of the device may be made while retaining the teachings of the invention. Accordingly, the above disclosure should be constructed as limited only by the metes and bounds of the appended claims.

What is claimed is:

1. A cleaning method for cleaning an optical lens of a compact disk drive by using a cleaning disk, the compact disk drive comprising a compact disk holder for holding a compact disk with a reflective surface, a motor for spinning the compact disk holder, an optical module having a movable optical lens facing the compact disk for reading data imprinted on the reflective surface of the compact disk, a lens driver for driving the optical lens up and down to focus the optical lens on the compact disk and stopping focusing and then retreating the optical lens when reading failure occurs, and a radial driver for driving the optical module horizontally, the cleaning disk comprising a cleaning surface having a cleaning means installed on the cleaning surface for cleaning the optical lens and a non-reflective innermost track, the cleaning method comprising:

(1) moving the compact disk holder out to load a disk;

(2) using the radial driver to drive the optical module to an innermost track of the loaded disk and using the lens driver to focus the optical lens on the innermost track of the loaded disk to identify whether the loaded disk is a cleaning disk;

(3) if the loaded disk is a cleaning disk, using the lens driver to hold the optical lens at a predetermined height under the cleaning surface of the cleaning disk; and (4) using the motor to spin the cleaning disk and using the radial driver to move the optical lens to interact with the cleaning means on the cleaning surface for cleaning the optical lens even if focusing on the cleaning surface is failed and reading failure occurs.

2. The cleaning method of claim 1 wherein the compact disk drive further comprises a push button for initiating the cleaning method.

3. The cleaning method of claim 1 wherein a computer is wired to the compact disk drive for initiating the cleaning method.

4. The cleaning method of claim 1 wherein the compact disk drive further comprises a movable disk carrier for carrying a compact disk in and out of the compact disk drive wherein the disk carrier is moved out of the compact disk drive to load the cleaning disk before initiating the cleaning method.

5. The cleaning method of claim 1 wherein the cleaning means is a brush for cleaning the optical lens.

6. A cleaning method for cleaning an optical lens of a compact disk drive by using a cleaning disk, the compact disk drive comprising a compact disk holder for holding a compact disk, a motor for spinning the compact disk holder, an optical module having a movable optical lens facing the compact disk for reading data imprinted on the compact disk, a lens driver for driving the optical lens up and down to focus the optical lens on the compact disk, and a radial driver for driving the optical module horizontally, the cleaning disk comprising a cleaning surface having a cleaning means installed on the cleaning surface for cleaning the optical lens, and an innermost track for allowing the optical lens to focus on, the cleaning method comprising:

(1) using the radial driver to drive the optical module to the innermost track of the cleaning disk and using the lens driver to focus the optical lens on the innermost track to obtain a focus height; and (2) using the motor to spin the cleaning disk, using the radial driver to move the optical lens outward, using the lens driver to hold the optical lens at the focus height under the cleaning surface, and the lens driver stopping driving the optical lens up and down for focusing on the compact disk so as to make the optical lens interact with the cleaning means if focusing on the innermost track is succeeded.

7. The cleaning method of claim 6 wherein when cleaning the optical lens, the radial driver drives the optical lens from the innermost track to an outermost track of the cleaning disk back and forth several times and the lens driver holds the optical lens approximately around the focus distance so as to make the optical lens in physical contact with the cleaning means.

8. The cleaning method of claim 6 wherein the compact disk drive further comprises a push button for initiating the cleaning method.

9. The cleaning method of claim 6 wherein a computer is wired to the compact disk drive for initiating the cleaning method.

10. The cleaning method of claim 6 wherein the compact disk drive further comprises a movable disk carrier for carrying a compact disk in and out of the compact disk drive wherein the disk carrier is moved out of the compact disk drive to load the cleaning disk before initiating the cleaning method.

* * * * *